United States Patent [19]
Gilmore, Jr.

[11] Patent Number: 6,008,817
[45] Date of Patent: Dec. 28, 1999

[54] COMPARATIVE VISUAL ASSESSMENT SYSTEM AND METHOD

[75] Inventor: John T. Gilmore, Jr., Amherst, N.H.

[73] Assignee: Comparative Visual Assessments, Inc., West Falmouth, Mass.

[21] Appl. No.: 09/001,842

[22] Filed: Dec. 31, 1997

[51] Int. Cl.⁶ .................................................. G06F 15/00
[52] U.S. Cl. .......................... 345/440; 345/135; 345/326; 345/339
[58] Field of Search .................................... 345/440, 135, 345/339, 326, 970, 965

[56] References Cited

U.S. PATENT DOCUMENTS

| | | | |
|---|---|---|---|
| 5,432,904 | 7/1995 | Wong | 705/4 |
| 5,515,487 | 5/1996 | Beaudet et al. | 345/440 |
| 5,596,703 | 1/1997 | Eick et al. | 345/326 |
| 5,627,973 | 5/1997 | Armstrong et al. | 705/10 |
| 5,680,557 | 10/1997 | Karamchetty | 345/334 |
| 5,699,456 | 12/1997 | Brown et al. | 382/226 |
| 5,835,902 | 11/1998 | Jannarone | 706/26 |
| 5,877,775 | 3/1999 | Theisen et al. | 345/440 |
| 5,886,709 | 3/1999 | Willman | 345/440 |

FOREIGN PATENT DOCUMENTS

WO 95/29452  11/1994  WIPO.
WO 97/02537  1/1997  WIPO.

*Primary Examiner*—Matthew M. Kim
*Assistant Examiner*—Cuong T. Thai
*Attorney, Agent, or Firm*—Kenneth F. Kozik

[57] ABSTRACT

A comparative visual assessment system including an input device, an output device, a computer system, the connected to the input device and the output device, the computer system having a user interface connected to a comparative visual assessment engine, the comparative visual assessment engine including assigning a plurality of weights to a corresponding plurality of components representing a subject, assigning a plurality of scores to the corresponding plurality of components representing the subject, determining a functional score for each of the plurality of components, determining an angle to be used for an output to the output device of a vector for each of the plurality of components, assigning the functional score to a length of the vector for each of the plurality of components, and displaying the vector on the output device.

11 Claims, 19 Drawing Sheets

$$\bar{f} = \frac{\sum_i w_i f_i}{\sum_i w_i}$$

$$\bar{f} = \frac{\Sigma_i W_i f_i}{\Sigma_i W_i}$$

Figure 6

$$\bar{f} = \frac{\Sigma_i (W_i / N) f_i}{\Sigma_i (W_i / N)}$$

Figure 7

Project Name:
Fictitious Auto Review
Cust Goal = Weighted Average of 3.99
on a scale of 5

Winner 92.9%   11/14/97
Honda          9:23 AM
3.71

Project Categories and Weights

1.0 Safety = 4.83
2.0 Sales Price = 4.17
5.0 Engineering Excellence = 4
3.0 Resale and Prestige = 3.34
4.0 Maintenance Expenses = 3.17

Cust Goal % Scores  0% 10 20 30 40 50 60 70 80 90 100%
                                                       109.9%
Performance
vs
Expectations 100% Cust Goal 3.99

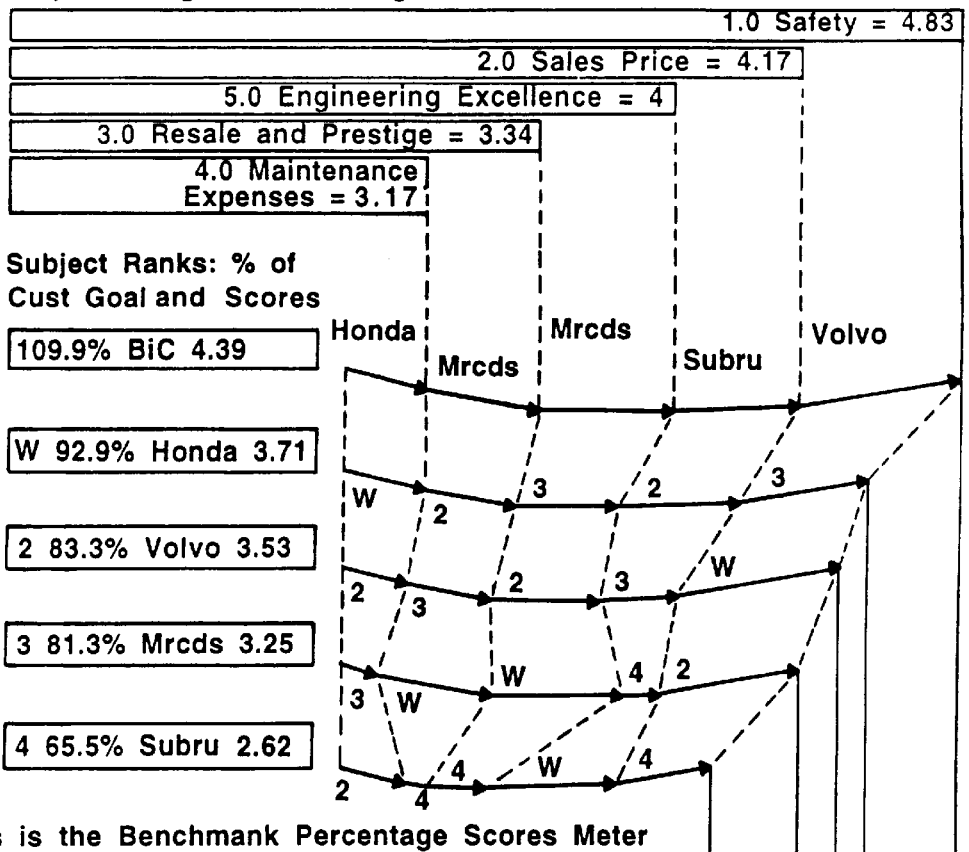
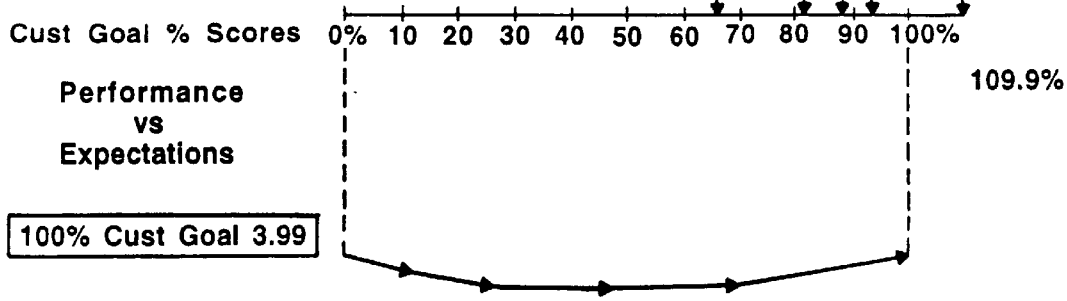
Figure 18

DISK EVALUATION PROJECT
QUADRANT CUMULATIVE SCORECARD
OF RAW UNWEIGHTED SCORES

| | | | A CORP | B CORP | C CORP | D CORP |
|---|---|---|---|---|---|---|
| | | | 0 | 2 | 3 | 4 |
| 22 | 28 | NET OF THE SCORES VS WINNER IN QUADRANT I | +18.43 | -3.79 79.5% | -0.14 99.2% | -0.43 97.7% |
| 27 | 34 | NET OF THE SCORES VS WINNER IN QUADRANT II | +30.22 | +1.88 106.2% | +1.12 103.7% | -2.52 91.7% |
| 35 | 46 | NET OF THE SCORES VS WINNER IN QUADRANT III | +43.64 | +4.77 110.9% | -0.67 98.5% | +0.12 100.3% |
| 47 | 83 | NET OF THE SCORES VS WINNER IN QUADRANT IV | +149.48 | +7.35 104.9% | -9.82 93.4% | -5.62 96.2% |
| | | LOSER'S SUBTOTAL | | +10.22 | -9.51 | -8.45 |
| | | TOTAL OF ALL SCORES | +241.78 | +251.99 | +232.27 | +233.32 |
| | | | 100.0% | 104.2% | 96.1% | 96.5% |

THESE ARE THE ROW NUMBER
BOUNDARIES OF THE QUADRANTS.

THIS TOP SECTION IS A SUMMARY
OF THE SCORES BY QUADRANTS:
THE FIRST 25%, THE SECOND 25%,
THE THIRD 25% AND THE LAST 25% OF
CONTRIBUTION TO THE TOTAL SCORE.

THE NUMBERS IN RED DENOTE A NEG VALUE, E.G. IN
THE FIRST QUADRANT, B CORP'S SCORE TOTAL WAS
3.79 LESS THAN A CORP'S TOTAL OF 18.43 OR 79.5%
OF 18.43

*Figure 20*

COMPARATIVE VISUAL ASSESSMENT SYSTEM AND METHOD

FIELD OF THE INVENTION

The present invention relates to the field of decision analysis, and more particularly to an enhanced computerized system and method of displaying descriptive data on an output device using elementary vector mathematics.

BACKGROUND OF THE INVENTION

Decisions. Decisions. Decisions. Each of us is faced with making decisions each and everyday as part of our family lives and our business lives. As is well known in the art, decisions have become more complicated in that even simple business decisions are influenced by a myriad of factors. As is also well known, the numerous factors that contribute to any single decision are themselves more and more complicated in that they often times do not contribute equally to the decision, i.e., some factors weigh more heavily in a decision than do others. As the number of factors involved in making any one decision has grown, and the resultant importance in achieving the 'correct' decision based on an analytical approach increases, it is well known that decision makers have turned to computers to aid them in the decision making process.

As is well known, computers provide a faster and more accurate vehicle to aid in the decision making process. As is also well known in this art, objective decision making is often based on numeric data used to describe various factors, or dimensions, of possible decision choices.

In one exemplary computer approach, factors affecting a decision are weighted and entered into a computer. The computer sums the weighted factors arithmetically, and the result of the simple addition is displayed on an output device such as a printer or display unit. But as it is well known in this art, complex decisions involve numerous factors, each of the factors involving numerous sub-factors, each of the sub-factors involving sub-sub-factors, and on and on. Thus, the simple method of weighting factors and summing their numeric equivalent is inappropriate, as it does not map to the complexity of decisions.

In another approach, a "spreadsheet" computer program is used to organize numeric data and generate results on a display device or printer device based on calculations performed on input data. In this approach, the results are often displayed in the form of "pie" charts and bar graphs. With this approach it is difficult to convey descriptive data since it would involve multiple dimensions of input data.

As is also well known, quantitative analytic techniques are being also used for what has been referred to as "benchmarking" product functionality and customer requirements. Benchmarking is a way of doing business that forces an external view to ensure correctness of objective goal setting. Benchmarking is an object-oriented process, a positive proactive process to change operations in a structured manner to achieve superior performance. Benchmarking is a process to determine the best-in-class practices and metrics, an on-going process, a discovery and learning experience, with the desired state being that of becoming "best-in-class."

In addition to the previous approaches mentioned above, another approach has been to use vectors and their corresponding lengths, directions, and widths, to measure quantitatively a number of factors used in benchmarking. With this approach, only a bias force of less than one and only a ratio of original score to weighted score is utilized.

What is needed is a simple yet more formal mathematical method of using vectors and their inherent mathematical properties to support an improved comparative visual assessment methodology.

SUMMARY OF THE INVENTION

In accordance with the principles of the present invention a comparative visual assessment system is provided including an input device, an output device, a computer system, the computer system connected to the input device and the output device, the computer system having a user interface connected to a comparative visual assessment engine, the comparative visual assessment engine including assigning a plurality of weights to a corresponding plurality of components representing a subject, assigning a plurality of scores to the corresponding plurality of components representing the subject, determining a functional score for each of the plurality of components, determining an angle to be used for an output to the output device of a vector for each of the plurality of components, assigning the functional score to a horizontal length of the vector for each of the plurality of components, and displaying the vector on the output device.

BRIEF DESCRIPTION OF THE DRAWINGS

The novel features believed characteristic of the invention are set forth in the appended claims. The invention itself, however, as well as features and advantages thereof, will be best understood by reference to the detailed description of specific embodiments which follows, when read in conjunction with the accompanying drawings, wherein:

FIG. 6 is a mathematical equation for calculating a node's weighted average;

FIG. 7 is a mathematical equation for calculating a node's norm weight;

FIGS. 11 through 18 illustrate the various sections of the exemplary vector diagram of FIG. 10;

FIG. 19 is a diagram of an exemplary summary sheet in accordance with the present invention;

FIG. 20 is a diagram of the top section of the summary sheet of FIG. 19; and

DETAILED DESCRIPTION OF THE PREFERRED EMBODIMENT(S)

Figure 1:
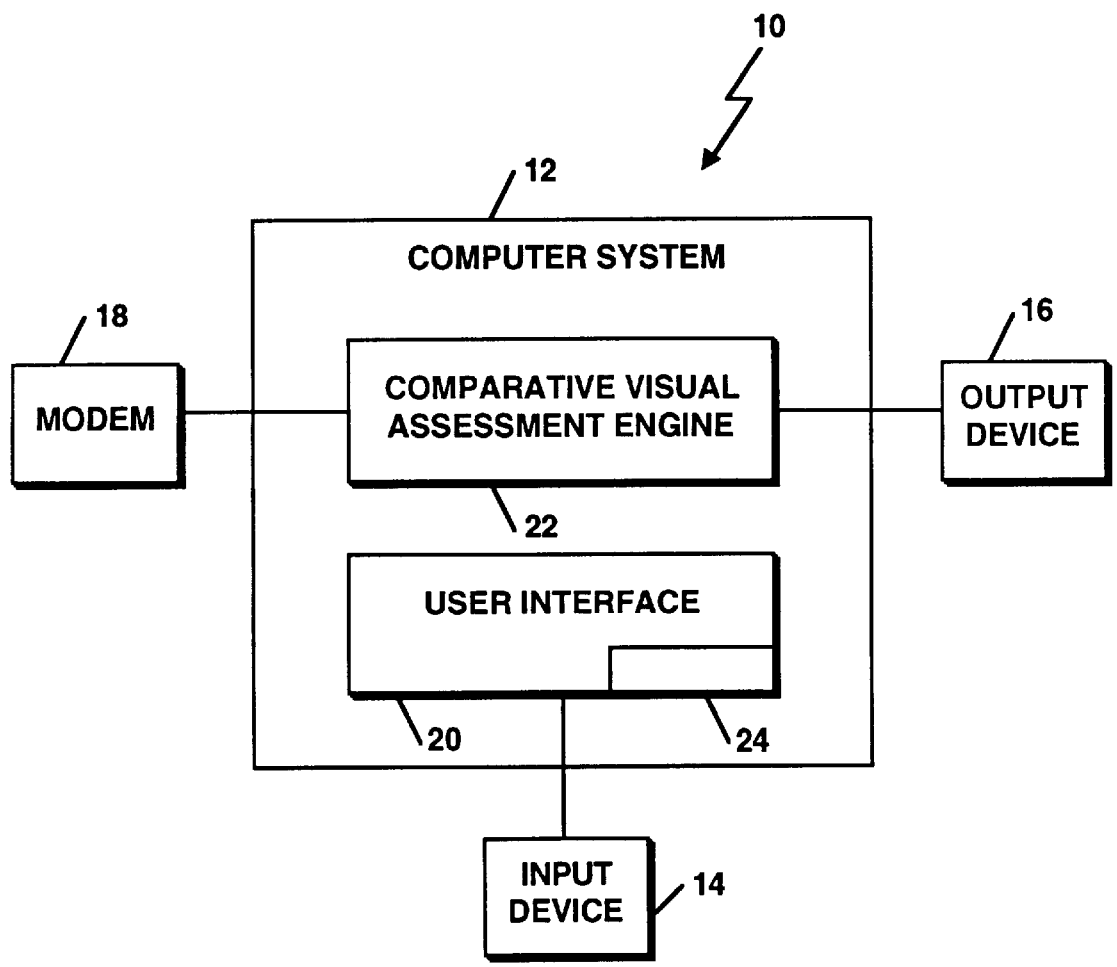
FIG. 1 is a block diagram of an exemplary comparative visual assessment system constituting a preferred embodiment of one aspect of the present invention.

Referring to FIG. 1, an exemplary comparative visual assessment system (CVAS) 10 is shown to include a computer system 12 having an input device 14, an output device 16, and an optional modem 18. It is preferred that the computer system 12 be loaded with Windows 3.1, Windows 95, or Windows NT operating system (O/S) from Microsoft Corporation (MS). In an alternate embodiment, the O/S of the computer system 12 may be the MAC Operating System from Apple Computer, Inc.

It is also preferred that the computer system 12 be loaded with a spreadsheet program to provide input and output to the visual assessment system 10. In the preferred embodiment, EXCEL from Microsoft Corporation is utilized.

It is also preferred that the input device 14 of the computer system 12 include a standard computer keyboard (not shown) and a standard computer mouse (not shown). Utilization of the standard computer keyboard and the standard computer mouse facilitates input of raw data to a comparative visual assessment user interface (CVAUI) 20, more fully described below.

In an alternate embodiment, raw data to the CVAS 10 may be provided by receiving the raw data via the modem 18 from a remote computer system (not shown). In still another embodiment, raw data input may be received by the CVAS 10 via a link to a communications network (not shown).

The output device 16 of the CVAS 10 may be a standard computer monitor or a standard computer printer, or both. The output device 16 provides a user (not shown) a means to view an output of the CVAS 10 in the form of vector diagram charts and/or custom design reports, more filly described below.

Raw data entered into the CVAS 10 through the CVAUI 20 feeds a comparative visual assessment engine (CVAE) 22. The CVAE 22 is the heart of the CVAS 10. It is the CVAE 22, which manipulates raw data and sends the final data to the output device 16.

As mentioned above, facilitation of raw data input is provided by the CVAUI 20. In the preferred embodiment, the CVAUI 206 is overlaid onto an EXCEL spreadsheet, replacing/augmenting many of the standard EXCEL spreadsheet toolbar buttons with a series of CVAUI toolbar buttons 24.

Fundamentally, the CVAS 10 is a decision analytical technique for: (1) scoring products (subjects or candidates) and measuring them against benchmarks derived from priorities and importance ratings; (2) visually displaying the results in unique graphic presentations of vector diagram charts; (3) allowing analysts and managers to point and click at individual vectors to 'drill up or down' the hierarchy of assessed comparative information; and (4) providing a summary of the performance versus customer expectations and a quadrant analysis of which features contributed most effectively to the total scores of each product (subject or candidate).

As stated above, the CVAE 22 is preferably written in Visual Basic for Applications and is an "add-in" to Microsoft's Excel Spreadsheet Program. The CVAE 22 becomes part of Excel and is executed by Icons in two toolbars of the CVAUI 20. This union provides the comparative analyst with the ability to use all the tools provided by the CVAS 10 as well as those provide by Excel.

The CVAS 10 uses two independent measurements: (1) how good is the subject or candidate and (2) what are the priorities and importance factors of the evaluator.

Figure 2:
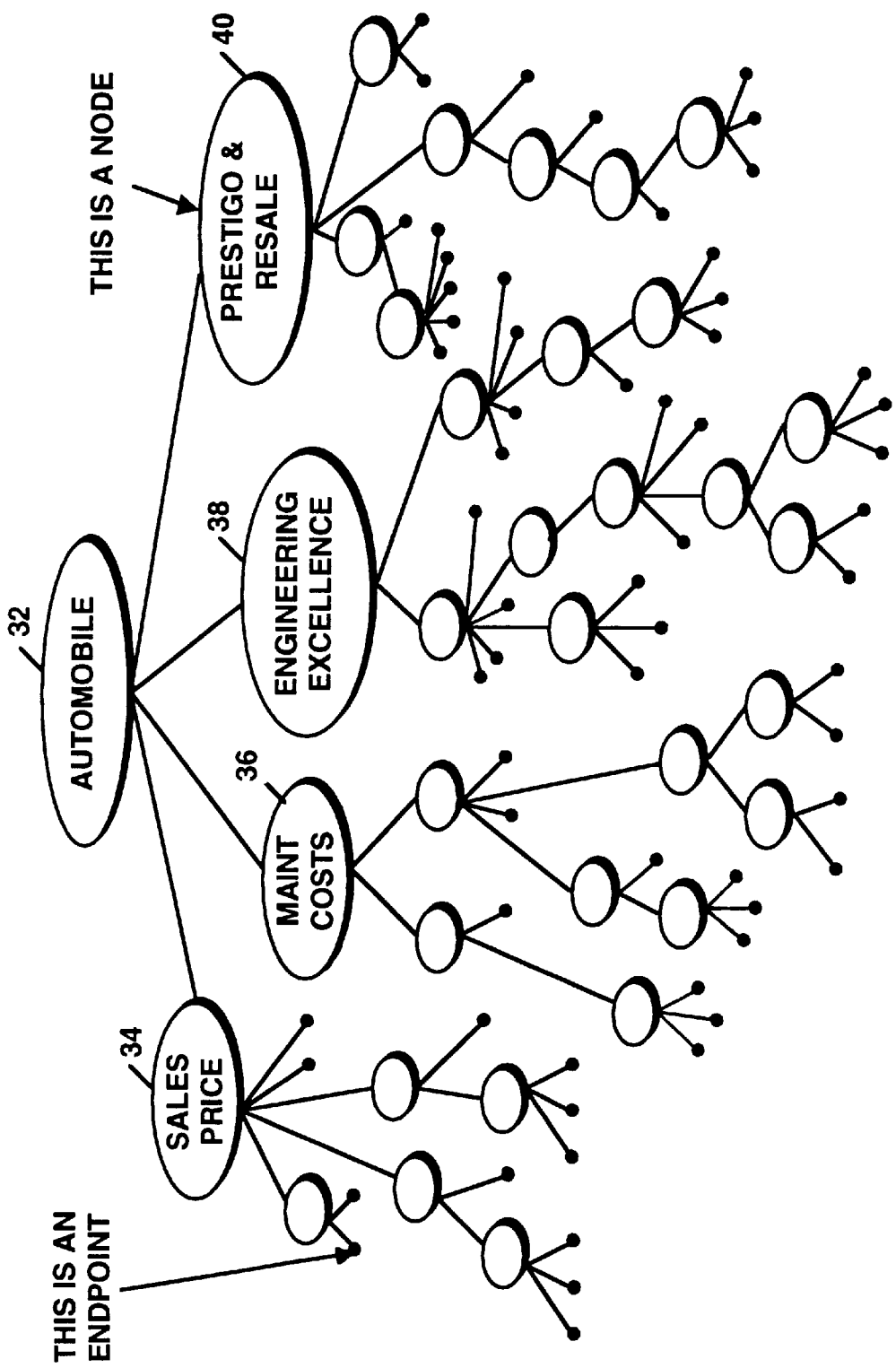
FIG. 2 is a block diagram of an exemplary outline.

The assessment process must examine all the component parts of a subject or candidate and the corresponding weights of importance for each subcomponent. As will be described in detail, the order of feature or performance subcomponent parts is organized by levels of evaluator priority and importance cascading down from the top of an outline. Referring to FIG. 2, an exemplary outline 30 for comparing automobiles is illustrated. The outline 30 is called a hierarchical tree. The branches of priority are called nodes (collectively shown as elliptical spheres) and the individual features are called endpoints (collectively shown as solid black dots). For example, a hypothetical buyer of an automobile 32 may consider sales price 34, maintenance costs 36, engineering excellence 38, and prestige/resale value 40 in selecting the automobile 32. It should be noted that a hierarchical node's subcomponents can be nodes and/or endpoints and are rated by importance as they relate to their parent node.

In order to better clarify the process we will focus from here on the comparison of vendors' products weighted by customer preferences, i.e. (1) the customer is the evaluator, (2) the subjects are vendors, (3) the hierarchy describes the priority of product features and performances of the product, and (4) the weights of the importance for each node's subcomponents in the hierarchy represent the customer bias. It should be noted, however, that the 'products' can be any candidate subject weighted by some set of importance factors. The CVAS 10 is about trying to understand what makes a product, such as the automobile 32 of FIG. 2, attractive or unattractive to a potential customer and how to compare two or more products and see what the winner did to meet customer demand and what the losers would have to fix to match or beat the winner.

Figure 3:
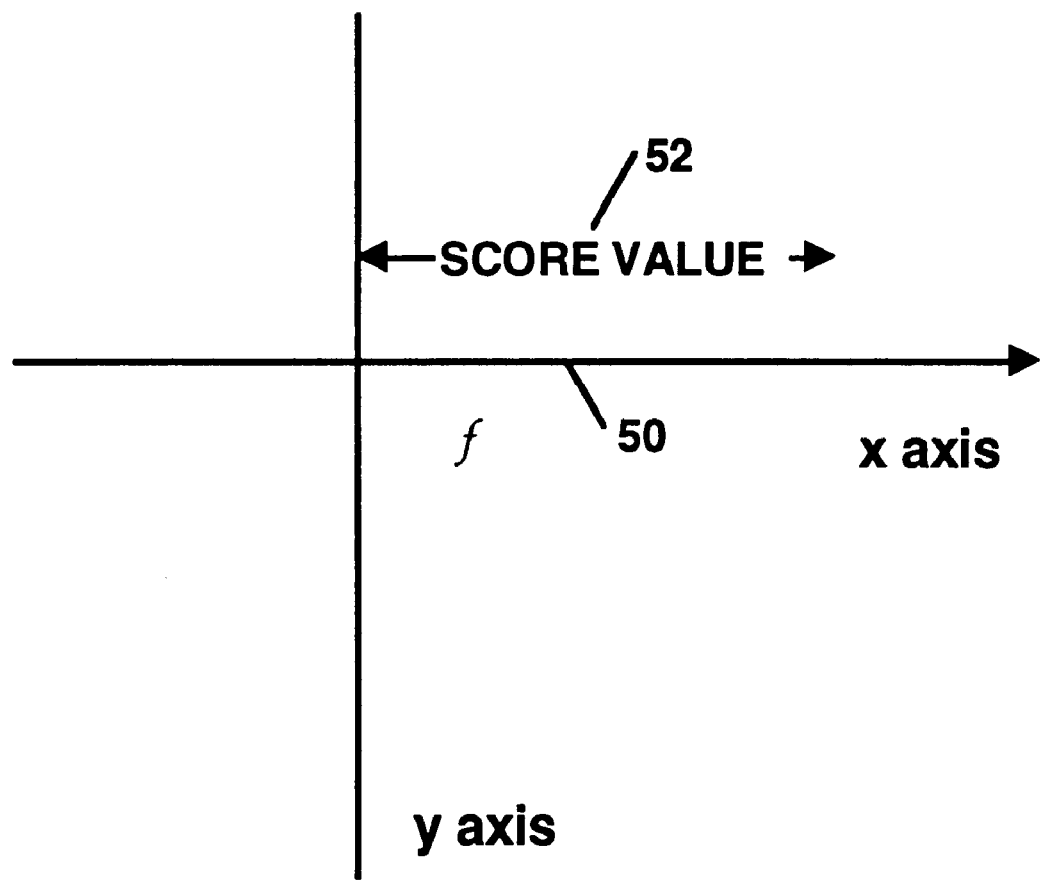
FIG. 3 is an exemplary initial vector representation.

Referring to FIG. 3, the CVAS 10 begins by assuming that all the components in a hierarchy are initially equal in importance and that each component may be represented by a vector 50 whose angle is initially zero degrees and whose length represents its scored value, f.

Once the weighting begins, each component of the hierarchy will be weighted relative to its importance within its own node. Because the CVAS 10 is interested in what attracts customers, the weights are called customer weights and referred to as W.

A norm weight of a node, N, is used in the CVAS 10 as the relative base from which all vector angles will be measured. The value of N of a given node is defined as the weighted average of all the node's customer weights W. If N were plotted as a vector its angle would be zero degrees and its length would be the weighted average of all the subcomponent weights of the node.

As will be seen below, the difference between the weight of each subcomponent's W and the Norm N, divided by W, determines the tangent of the angle of each subcomponent's vector. Thus, the angle of a subcomponent's vector shows its importance or lack of it to the node.

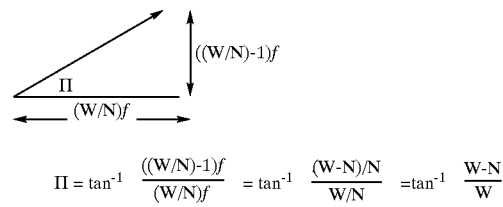

$$\Pi = \tan^{-1} \frac{((W/N)-1)f}{(W/N)f} = \tan^{-1} \frac{(W-N)/N}{W/N} = \tan^{-1} \frac{W-N}{W}$$

For example, if all the weighs of a node were equal in importance, the Norm weight would be the same value as well and the tangent for each vector's angle would be zero and all the vector angles would be horizontal. This is the case before any biased weighting is applied where all weights are equal to one.

If the customer weight is equal to the Norm weight, i.e. (W–N) / W=0, the vector is horizontal at an angle of zero degrees.

A weight greater than the Norm indicates that the component is regarded as having some degree of importance above the norm for that node and its vector will have a positive angle above the horizontal.

A weight less than the Norm indicates it is of lesser importance and its vector will have a negative angle below the horizontal.

A weight of zero indicates the component is considered irrelevant and unnecessary and the vector will have a negative angle of ninety (90) degrees pointing straight down with no horizontal×value.

A negative weight indicates the component is considered undesirable and consequently any score should detract from the total score. The angle of that vector will be negative with a negative×value.

Most people prefer to weight things by some numerical spread, zero to ten for example, or by grades, such as A, B, C+, or by terms such as 'excellent,' 'good,', etc. The CVAS 10 provides a conversion table in the CVAE 22 to define numerical weights and scores as symbolic expressions with no limit to the size of the numerical ranges.

Statistical mathematics, hierarchical domain scoring trees, customer importance weights and product evaluations are used in the CVAS 10 to produce a score for each product at each node in a given domain's hierarchical scoring tree for each set of customer profile weights.

To review, the CVAS 10 starts with a hierarchical domain defined as an outline. In the outline there are two kinds of elements. The first is called an endpoint and is a single entity with no subcomponents. The other is called a node and is a set containing other nodes and/or endpoints. For each of the tens to hundreds of elements in a hierarchical domain, whether they be nodes or endpoints, there will be a score designated as f for each candidate subject (product, person, or argument) being assessed.

If the element is an endpoint, i.e. having no subcomponents, its score f will be a data value assigned externally by some expert who has derived that value by some external precede that can range from a good guess to an expert opinion to a very elaborate evaluation survey. If the element is a node, i.e. having subcomponents, its score f will be a calculated value determined by the weights of importance of each subcomponent element and the elements' corresponding scores for each subject being assessed.

In summary, the f score for an endpoint is a data value. $\bar{f}$ is a symbol defined as the weighted average of a node's subcomponent's scores and weights. That value when used as the node's score in subsequent actions is represented as f. The f score for a node is a calculated value.

The symbol $\bar{f}$ is used to represent the weighted average of its subcomponents scores. It is defined to be the sum of all the products of each subcomponent's weight W, times its corresponding score f, all divided by the sum of all the weights of all the subcomponents in the Node. A node's score f is equal to it's $\bar{f}$.

Figures 4, 5:
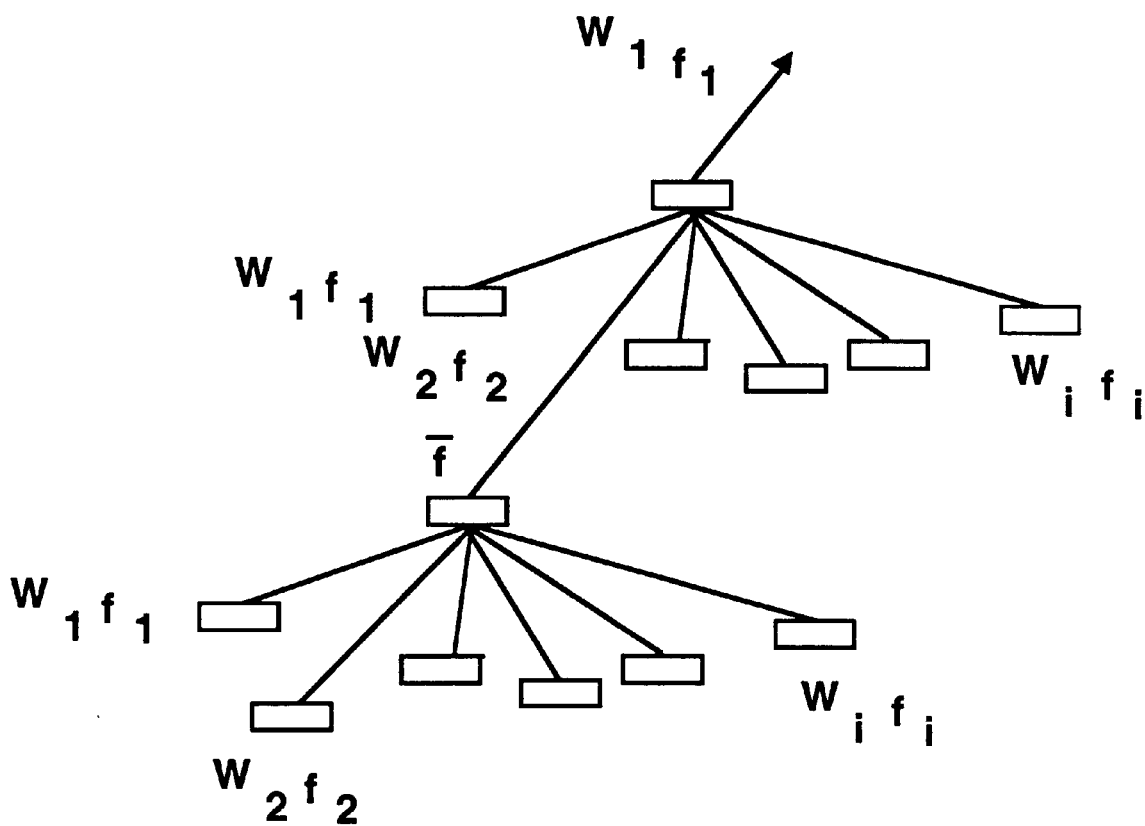
FIG. 4 is a mathematical representation of a calculation of a weighted average score for a node.
FIG. 5 is an exemplary hierarchical tree illustrating the propagation of calculated scores in accordance with the present invention.

Referring to FIG. 4, if the letter i is used to index the number of subcomponents of a node, then its weighted average $\bar{f}$ may be expressed as illustrated.

Referring now to FIG. 5, the propagation of weighted average calculations within a hierarchical tree continues up the hierarchy node by node with each node's f score being determined using its subcomponents' f scores and $W_i$ weights until reaching the top node where its score f is the final score for each candidate being assessed.

As was mentioned above, the CVAE 22 displays the results at each node graphically in a vector (arrow) diagram linked to the other nodes in a hierarchical tree. Each vector representing a node or endpoint element shows by its angle the perceived importance of the element, and by its horizontal length its perceived resultant score. For a full understanding of the present invention and how it has embraced formal vector mathematics to drive vector diagrams to show the results of bias forces on a given subject's score can be found in Appendix A.

In review, the equation of a node's weighted average is shown in FIG. 6, where i stands for the index of subcomponents in the node. It is the sum of the products of weights times their corresponding component scores all divided by the sum of the weights.

Referring to the equation shown in FIG. 7, the Norm weight of the node is denoted as N, where the numerator represents the sum of the horizontal values (x) of each vector before scaling and the denominator represents the scale which determines the proportionate size of each vector, i.e. the sum of the weights divided by N. The technique just described, i.e. the technique of incorporating the norm weight of the node into the fundamental weighted average equation, is key because the norm is the standard from which each vector is drawn.

When the vectors are connected to one another they create a vector string whose horizontal length (x) is equal to the weighted average of their node.

The determination of the height of each vector using N is fully described in Appendix B.

Figure 8:
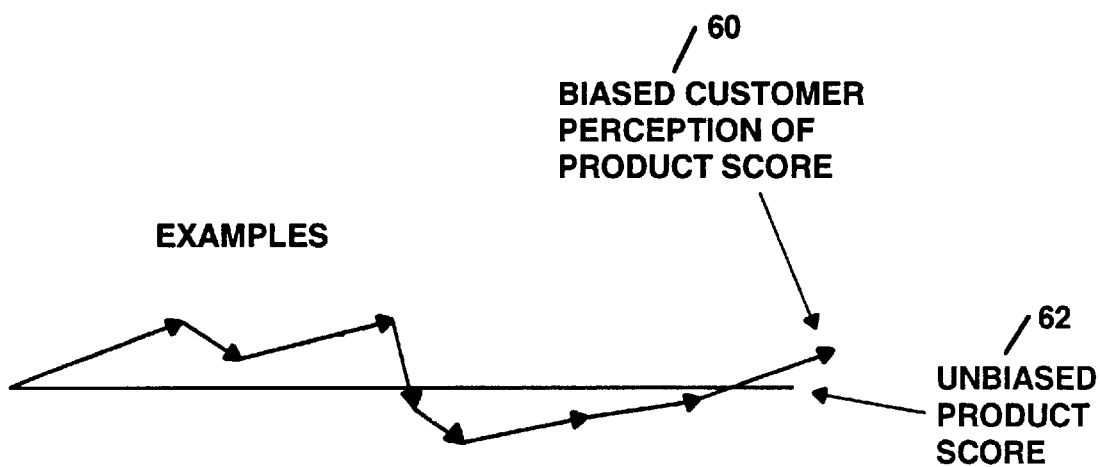
FIG. 8 is an exemplary vector string output of the CVAS.

The CVAS 10 graphical presentations utilize sets of vectors to denote how individual products scored at each node. They portray how the scores were derived from their subcomponent scores and how they were affected by customer requirements. Vector charts are simple in that a node's score is represented by one or more connected arrows called vector strings. Each vector represents one of the node's subcomponents. Thus, by viewing the connected (children) vectors we can better observe why the parent node scored so well or so poorly. For example, referring to FIG. 8, an exemplary case depicts how a product scored as perceived by a specific customer profile 60 as opposed to how the product scored with no bias influences 62.

Figure 9:
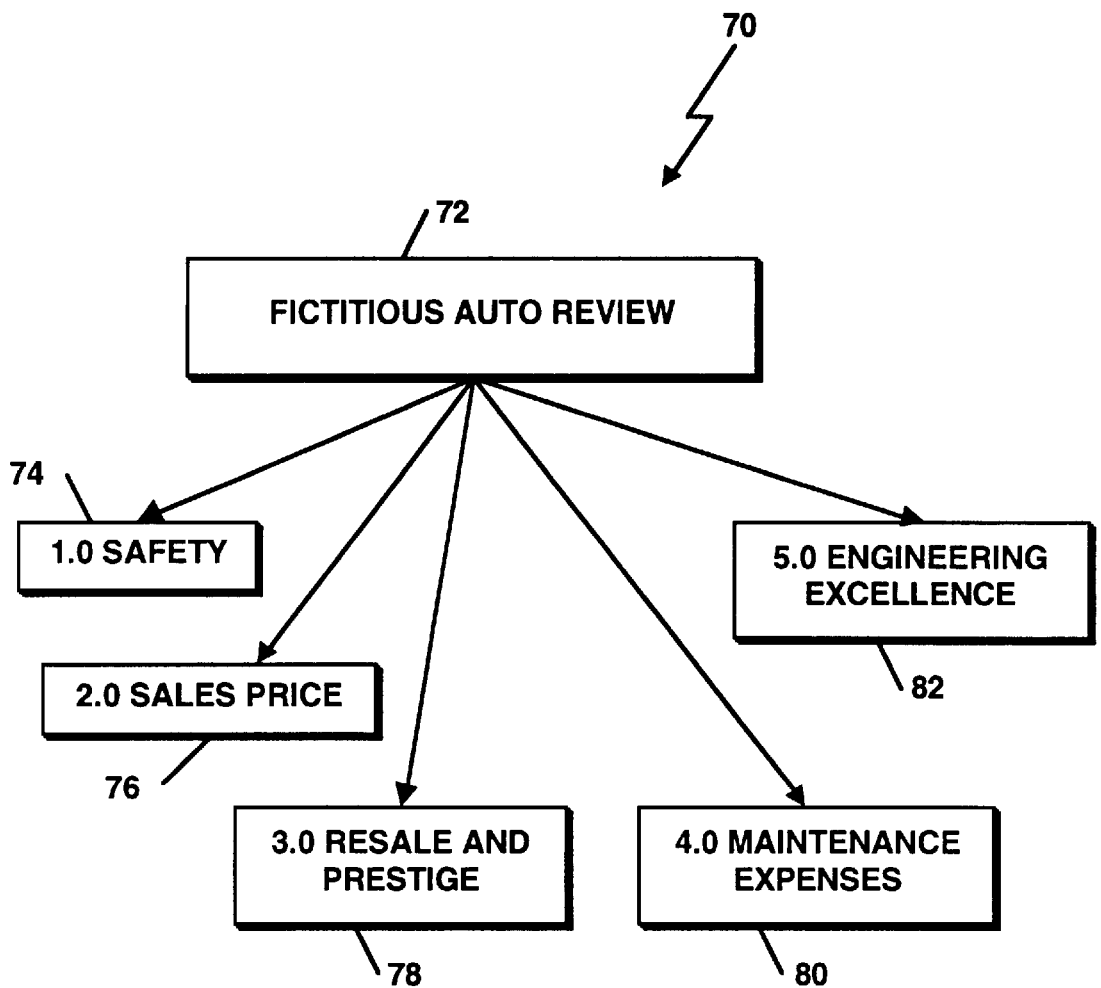
FIG. 9 is an exemplary automobile selection outline.
Figure 10:
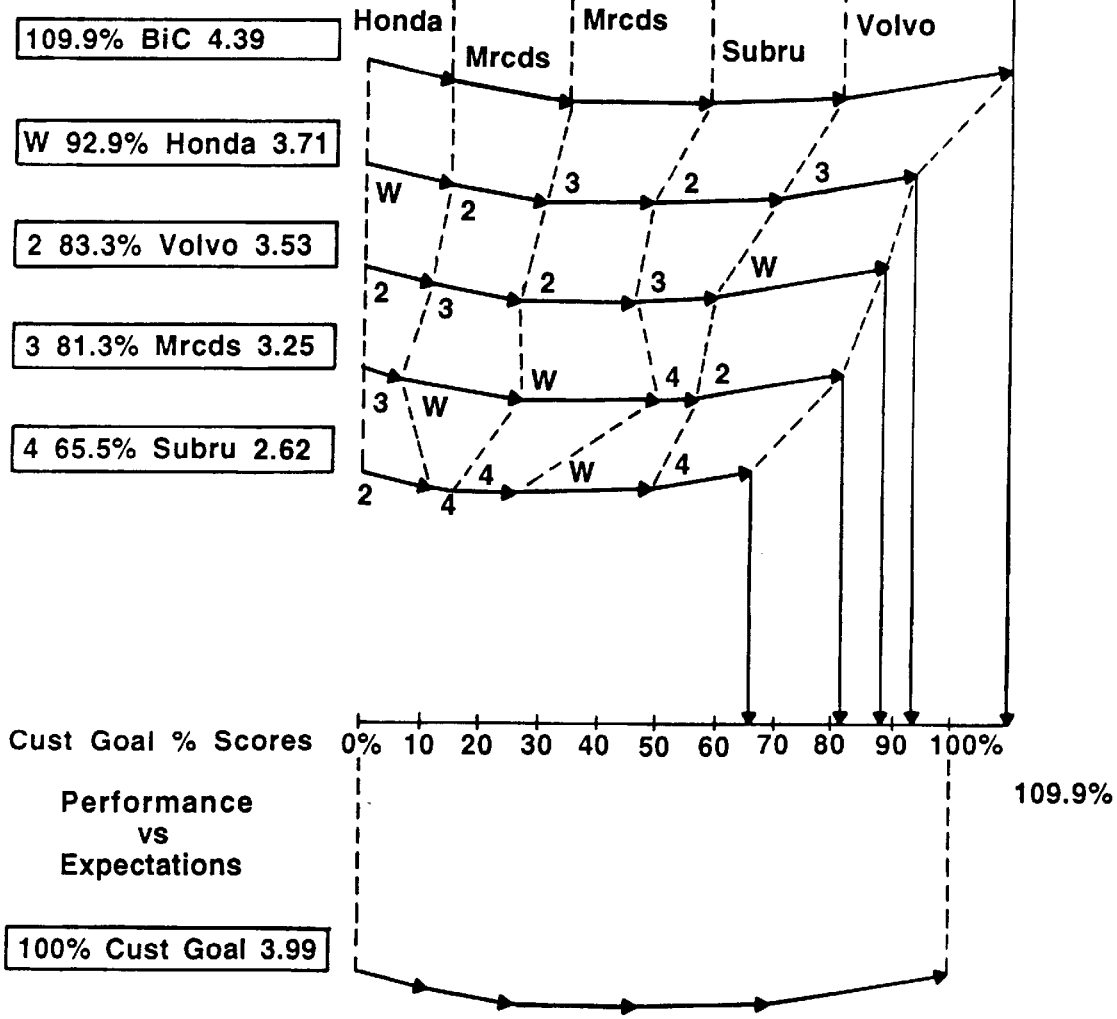
FIG. 10 is an exemplary vector diagram of the automobile selection outline of FIG. 9.

Referring to FIG. 9, by way of example, a fictitious automobile hierarchy 70 illustrates five components involved in a potential buyer's decision to purchase a car 72 Specifically the components are safety 74, sales price 76, resale and prestige 78, maintenance expenses 80, and engineering excellence 82. The corresponding vector diagram is illustrated in FIG. 10, wherein the categories are arranged by importance. FIGS. 11 through 18 illustrate in detail the various components of the vector diagram illustrated in FIG. 10.

Figure 11:
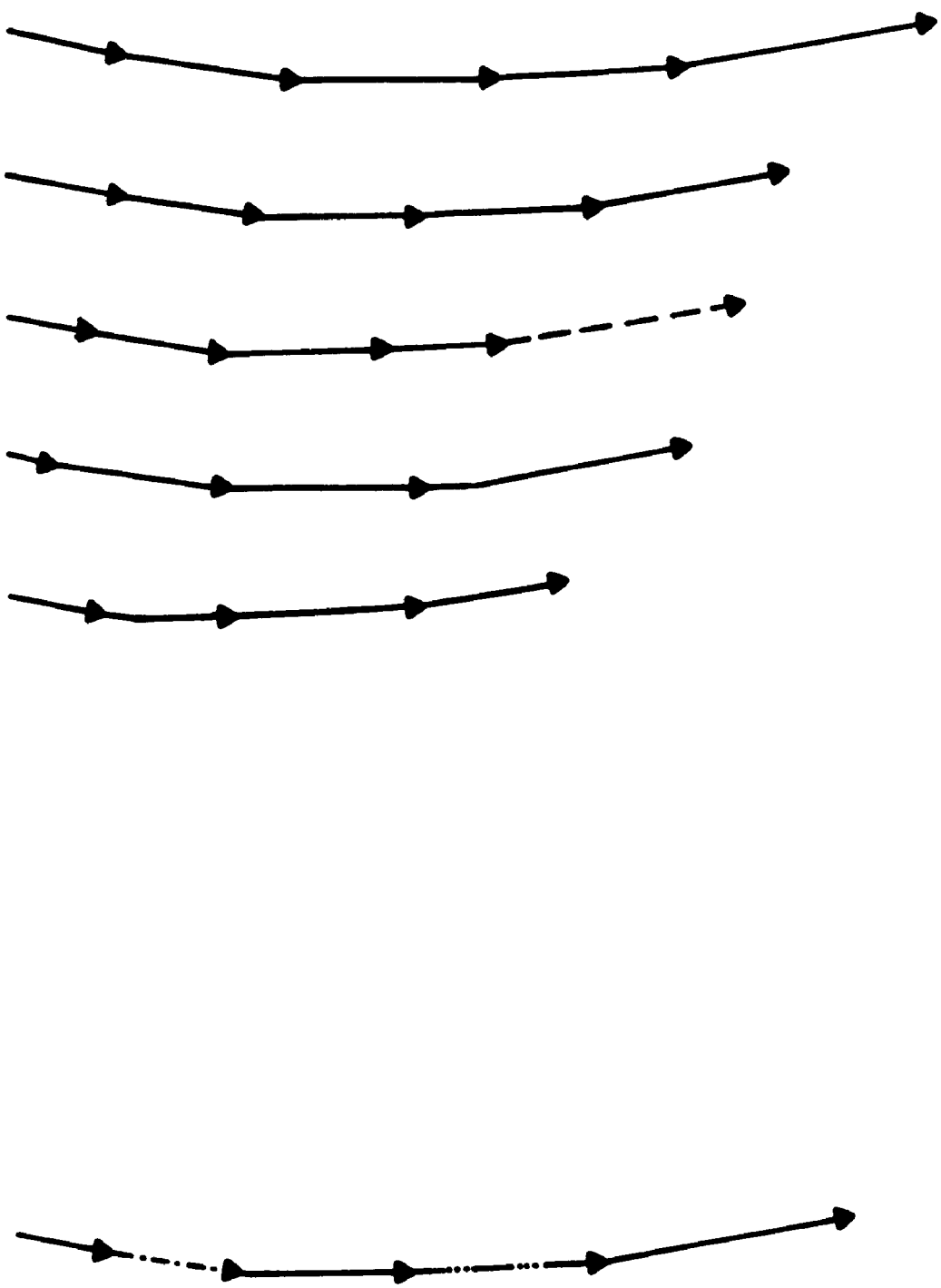

Referring now to FIG. 11, an illustration of a set of five vector strings representing four automobiles and a hypothetical automobile having the best subcomponents of the other four is shown. The leftmost or first vector in each vector string represents maintenance expenses. The second vector in each vector string represents resale and prestige. The third vector in each vector string represents engineering excellence. The fourth vector in each vector string represents sales price. The fifth vector in each vector string represents safety. These subcomponents are sorted in order of customer importance from left to right. Another option is to sort the vectors in hierarchical order.

Each vector string represents one of the subjects, i.e. automobiles. Their horizontal length represents their total score. They are sorted by total score from top to bottom. The top vector string is a hypothetical product consisting of the best scores from all the candidates and it s called the "best in class benchmark." In the preferred embodiment the winner for each subcomponent is colored in red.

Figure 12:
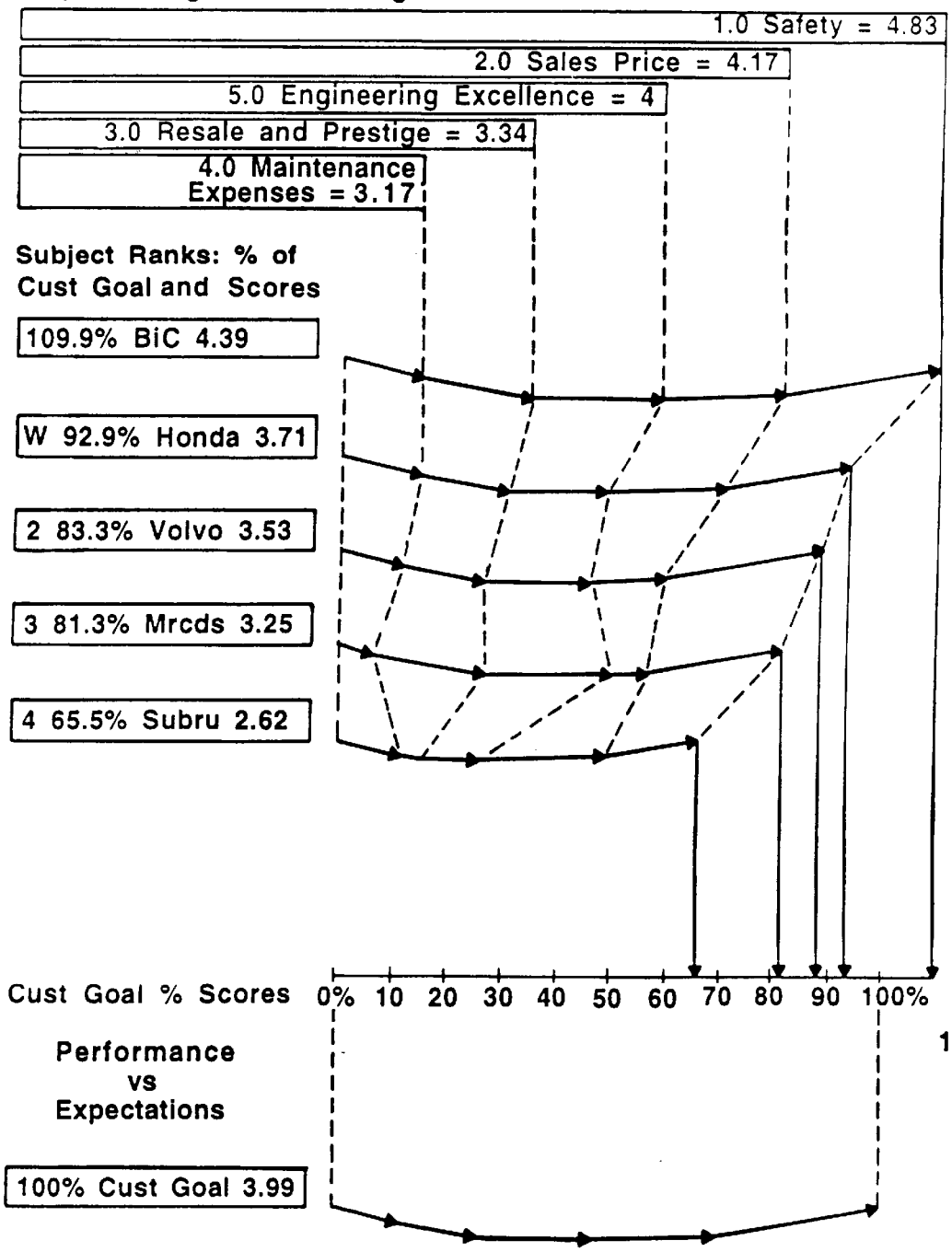

Referring to FIG. 12, the best way to look at a vector chart is to envision the subjects racing to the finish line at the right hand side of the page. But rather than just a dash, hurdles are put in the way, namely, the individual hierarchical subcomponents, which can be sorted from left to right by importance or hierarchical order. The grid lines connect the tips of the corresponding vectors of each subcomponent of each subject's vector string to the right-hand edges of the corresponding subcomponent boxes.

The result is set of dotted grid lines, which may be turned on and off, that serve as the 'hurdle' at each subcomponent with the winner winding up the furthest to the right with the longest vector string. The dotted grid lines also provide the observer with the ability to easily see how each candidate faired for each subcomponent.

Figure 13:
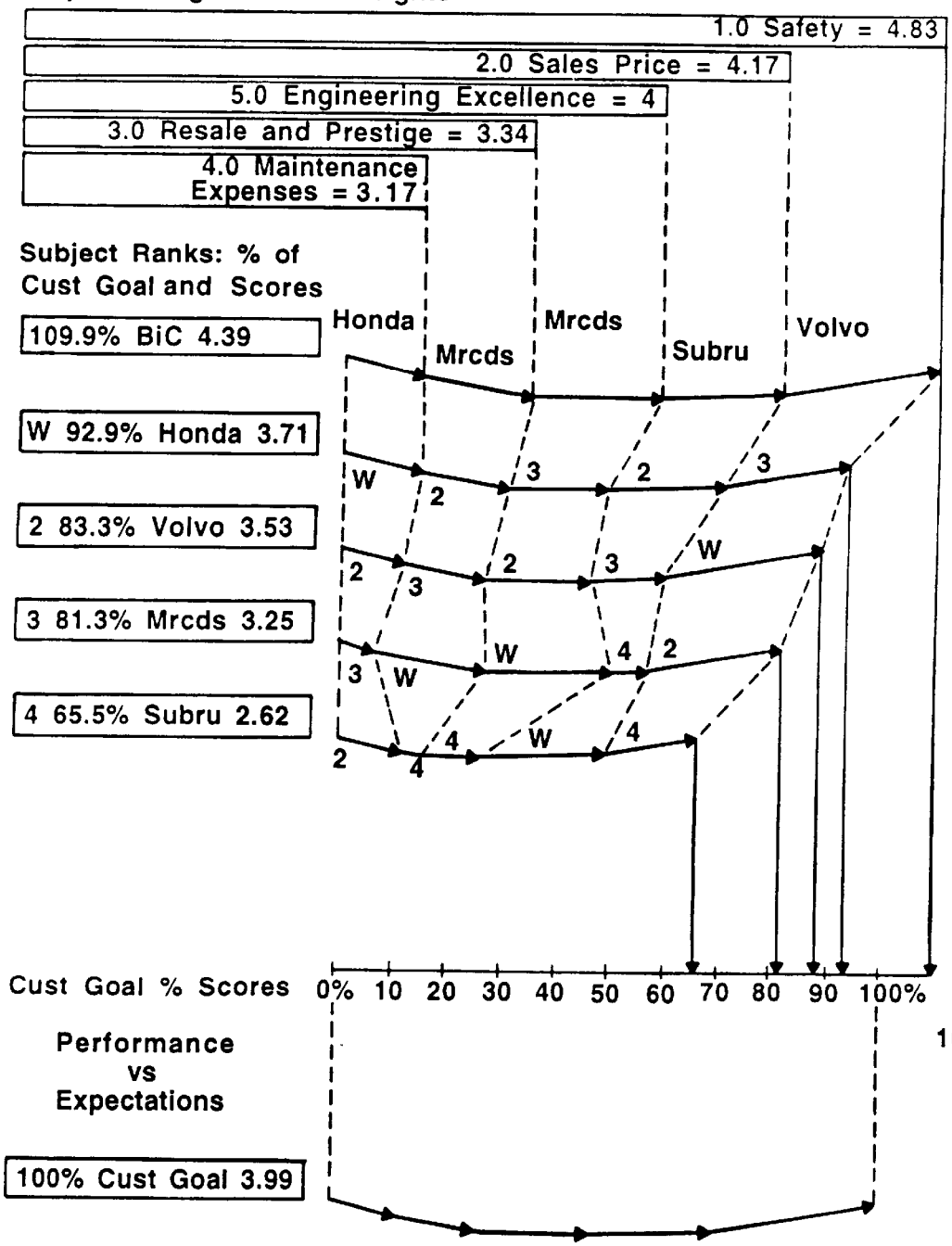

Referring to FIG. 13, each vector string plays a key role in a subject trying to win at each node. The CVAE 22 provides a rank numeral or "W" to indicate how each subject scored for each sub-component, i.e. "W" represents the winner, "2" represents second place, "3" represents third place, etc.

The "best in class" top vector string has the name of the subject who came in first for each subcomponent displayed in red, for example. If there is a tie the word 'ties' in blue, for example, and underlined is displayed. In addition, the winning vector for each subcomponent is displayed in a color, red for example. The ranks may be turned off and on.

Figure 14:
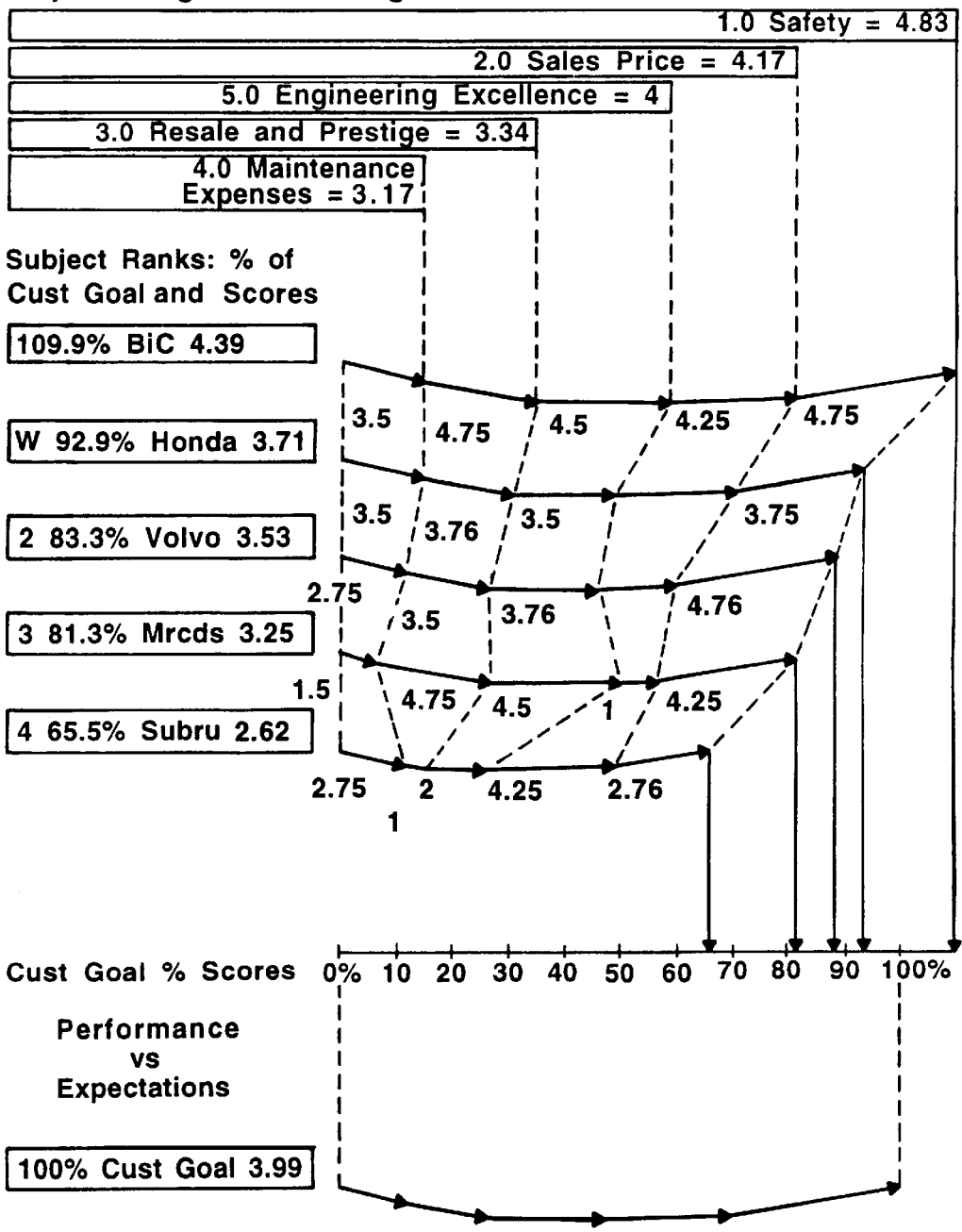

Referring to FIG. 14, each vector string plays a key role in a subject winning the current node. The CVAE 22 provides a numeric score of each subcomponent's vector in each subject's vector string. The display of the scores and ranks makes a busy chart and usually one or the other is displayed. The current display is showing the scores before weighting has been applied.

Figure 15:
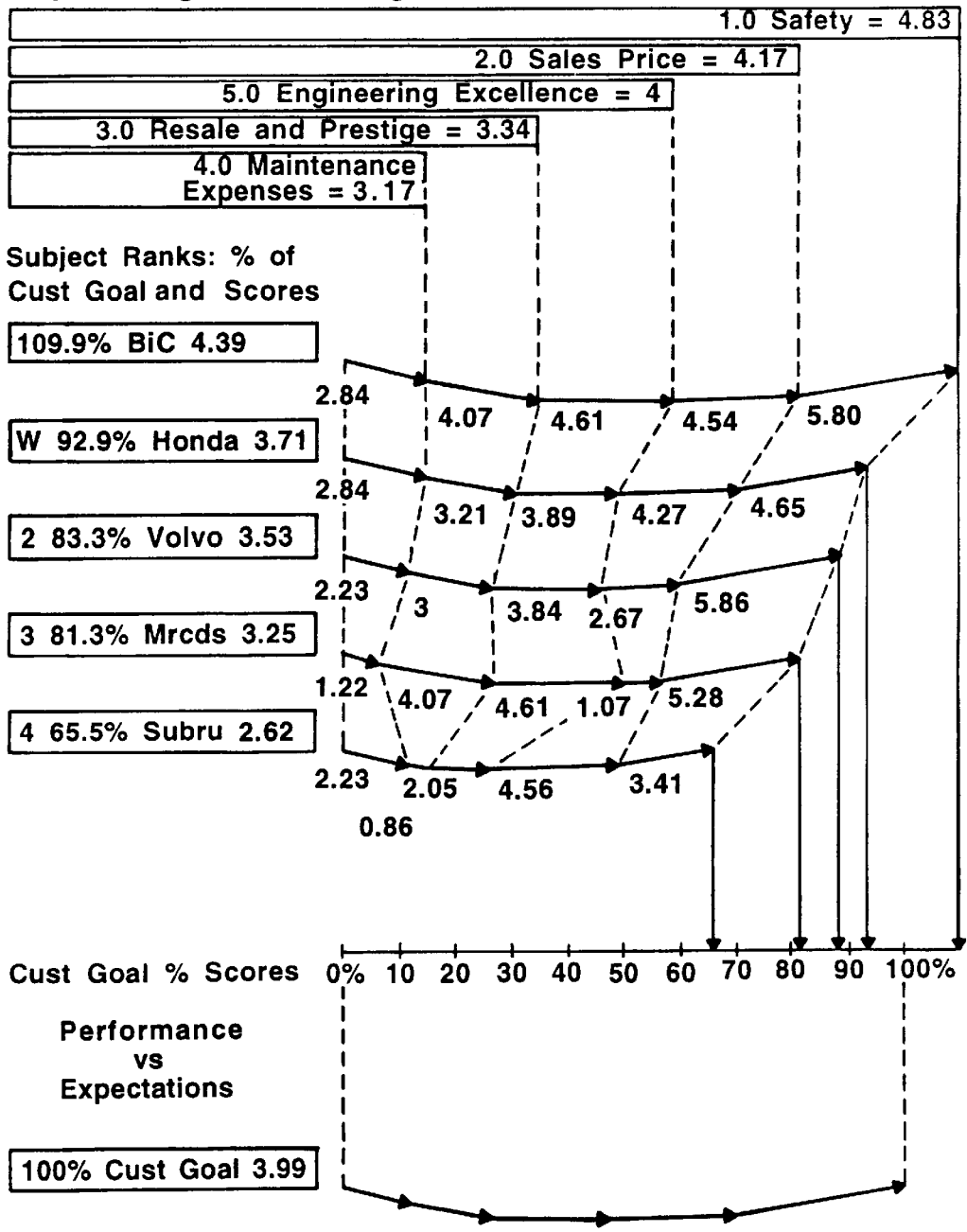

Referring to FIG. 15, each vector in each vector string plays a key role in a subject winning the current node. The CVAE 22 provides a numeric score before and after weighting of each subcomponent's vector in each subject's vector string. The current display is showing the scores after weighting has been applied.

Figure 16:
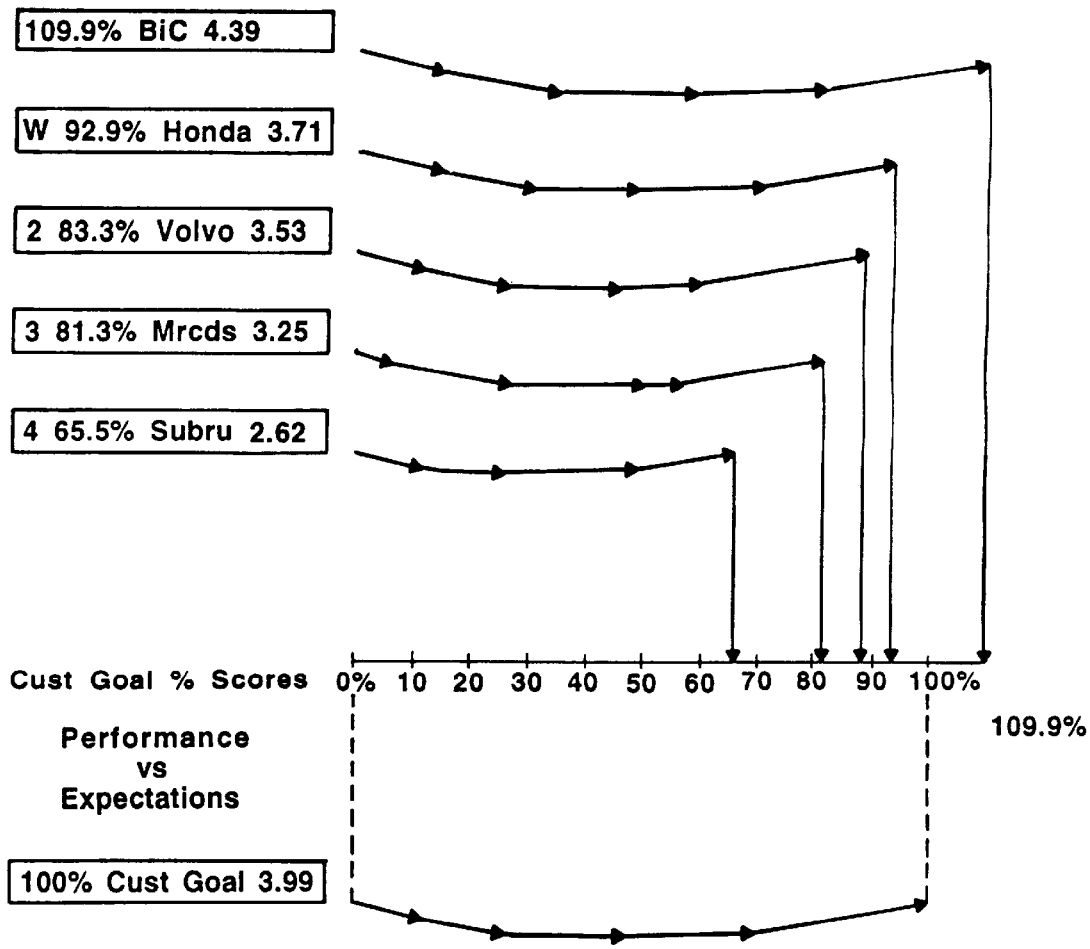

Referring to FIG. 16, the names of the vector strings are called subjects (or candidates or contenders). Each subject's box is positioned to the left of its vector string and contains its numerical ranking, its score in terms of the percentage of the selected benchmark, its name and its numerical score.

If the subject is the winner for this node, the numerical rank will be "W" and the box's background will be a deep red, for example. The contents of the box will be repeated above the right end of the best in class score line.

If a subject has tied for first, then its numerical rank will be one and its box's background will be blue, for example. There will be at least one more subject with a rank of one with the same color scheme. However, since there will be no individual winner there will be no winning box at the upper right end of the best in class score line.

Figure 17:
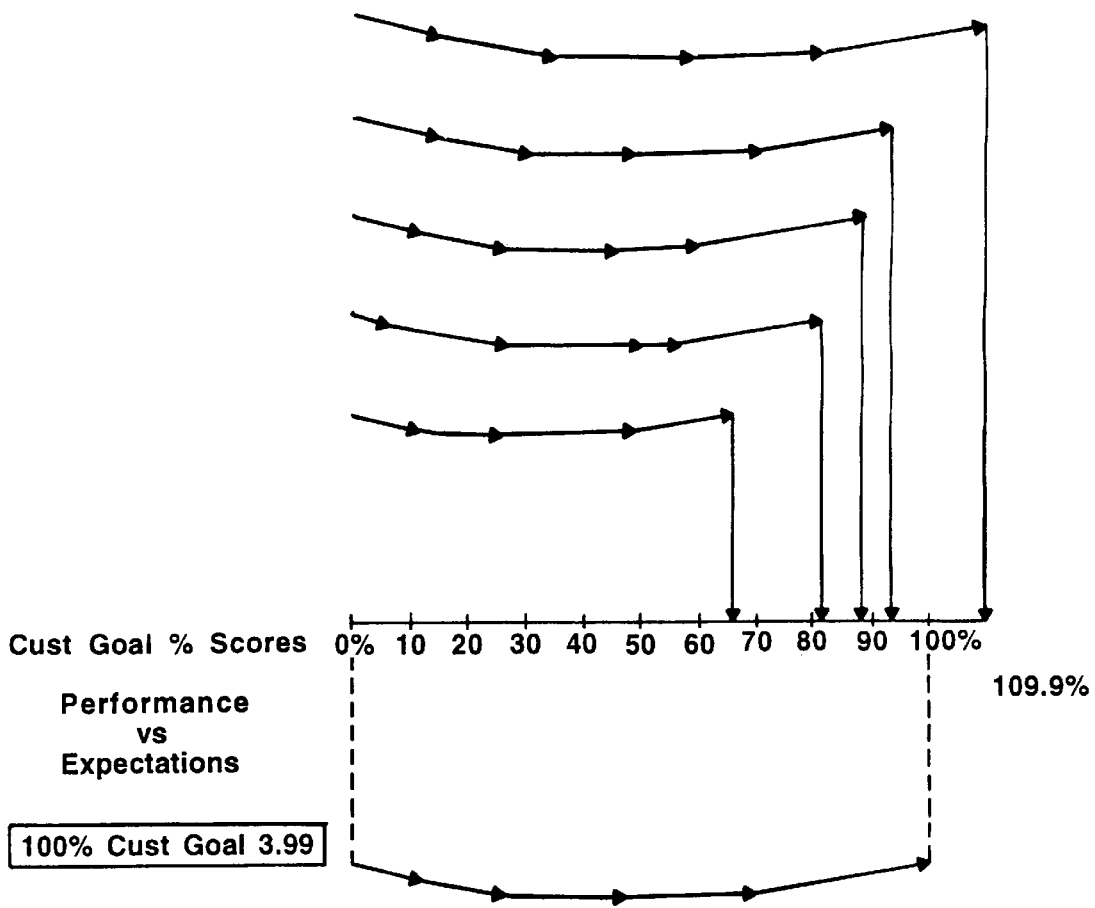

Referring to FIG. 17, the diagram is the same as shown in FIG. 16 but with the names of the subjects and the name and score of the winner removed. This is ideal when communicating with various candidates in a post-analysis review to conceal the names of the other candidates.

Referring to FIG. 18, the Node Goal, i.e. the customer goal, benchmark is a hypothetical product whose subcomponent scores are equal to this current node's importance weights. It is based on the assumption that if the score of a particular subcomponent is equal to its importance weight then that subcomponent has met the requirements or expectations of those who have set the values of the importance weights, i.e., the customer if this is a product comparative analysis. The node goal is displayed in the same format as a subject at the foot of a chart.

There are three alternatives for assigning a benchmark. They are the node or customer goal, the best in class or any one of the individual subjects, e.g., the winning subject of the analysis.

Figure 19:
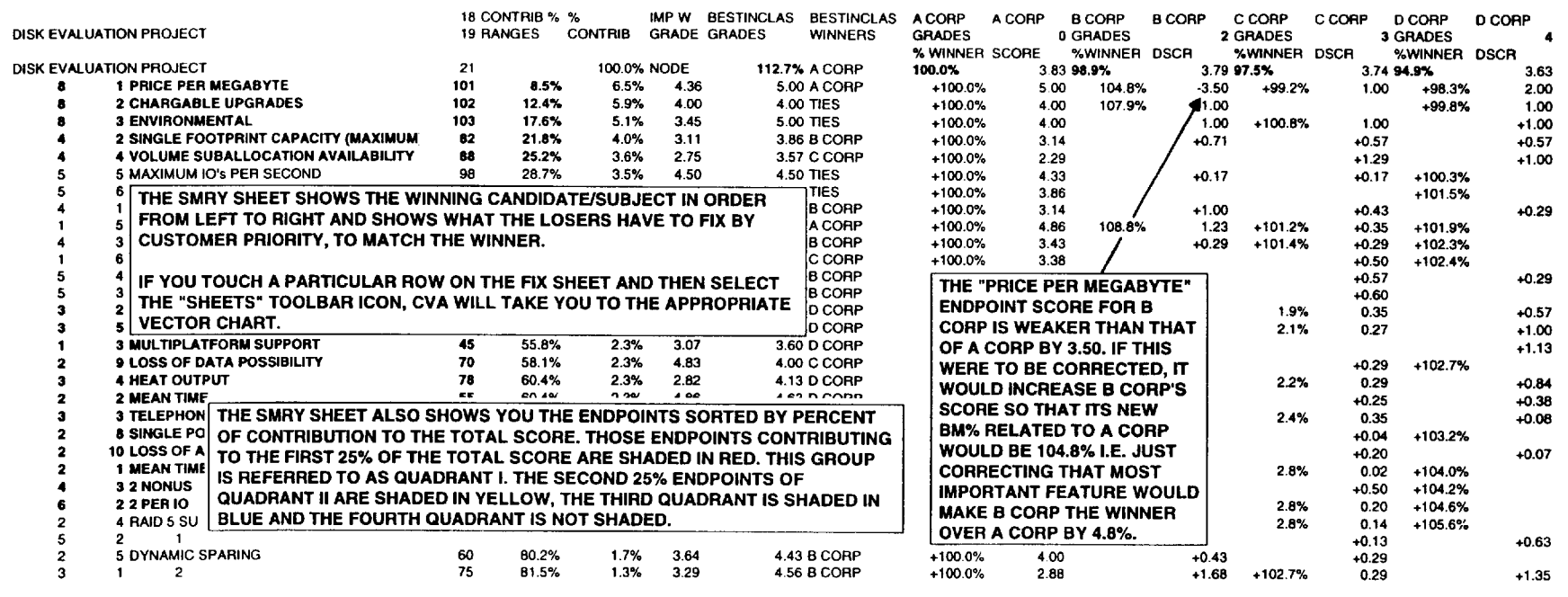

Referring now to FIG. 19, an exemplary summary sheet 90 prepared by the CVAE 22 is illustrated using an exemplary disk evaluation project. The summary sheet 90 provides analysts with some key information. The subjects are repositioned in the summary sheet 90 by rank from left to right with the winner at the leftmost position. The benchmark has been set to be the winner's score so that all percentages are related to that of the winner.

The summary sheet 90 consists only of endpoints sorted by customer importance. Each cell in the dScr column of each loser subject contains the plus or minus difference between the winner's endpoint score and that of the subject's endpoint. If the difference is negative, i.e. the subject's score is less than the winner's score, the value will be displayed in color, preferably red; if it is superior to that of the winner's it will be displayed in an alternate color, preferably blue.

The grade columns of the subjects have been set to reflect the benchmark percentages relative to the winner's 100%. However, if the subject's difference is negative, i.e. its score is less than that of the winner's score for that endpoint, the CVAE 22 shows what can happen if the score is improved to be equal to that of the winner by upgrading its percentage of winner accordingly. Thus, one can scan the various subjects' columns and see why they lost to the winner and what would have to be corrected in order of customer priority to match or beat the winner.

The endpoints contributing to the first 25% of the total score are preferably shaded in red, which is referred to as quadrant 1. The second 25% endpoints are preferably shaded in yellow and referred to as quadrant 2. The third 25% endpoints are preferably shaded in blue and referred to as quadrant 3. The fourth 25% endpoints are preferably not shaded and referred to as quadrant 4. The quadrants in descending order show the key role that the more important endpoint plays in determining each candidate's score.

The top section of the summary sheet 90, shown in detail in FIG. 20, contains a summary of the scores by quadrants. This shows the impact of how endpoints with larger percentages of contribution affects the winner and why losers with strong scores lose because they neglected to strengthen those features most important to the customer.

Figure 21:
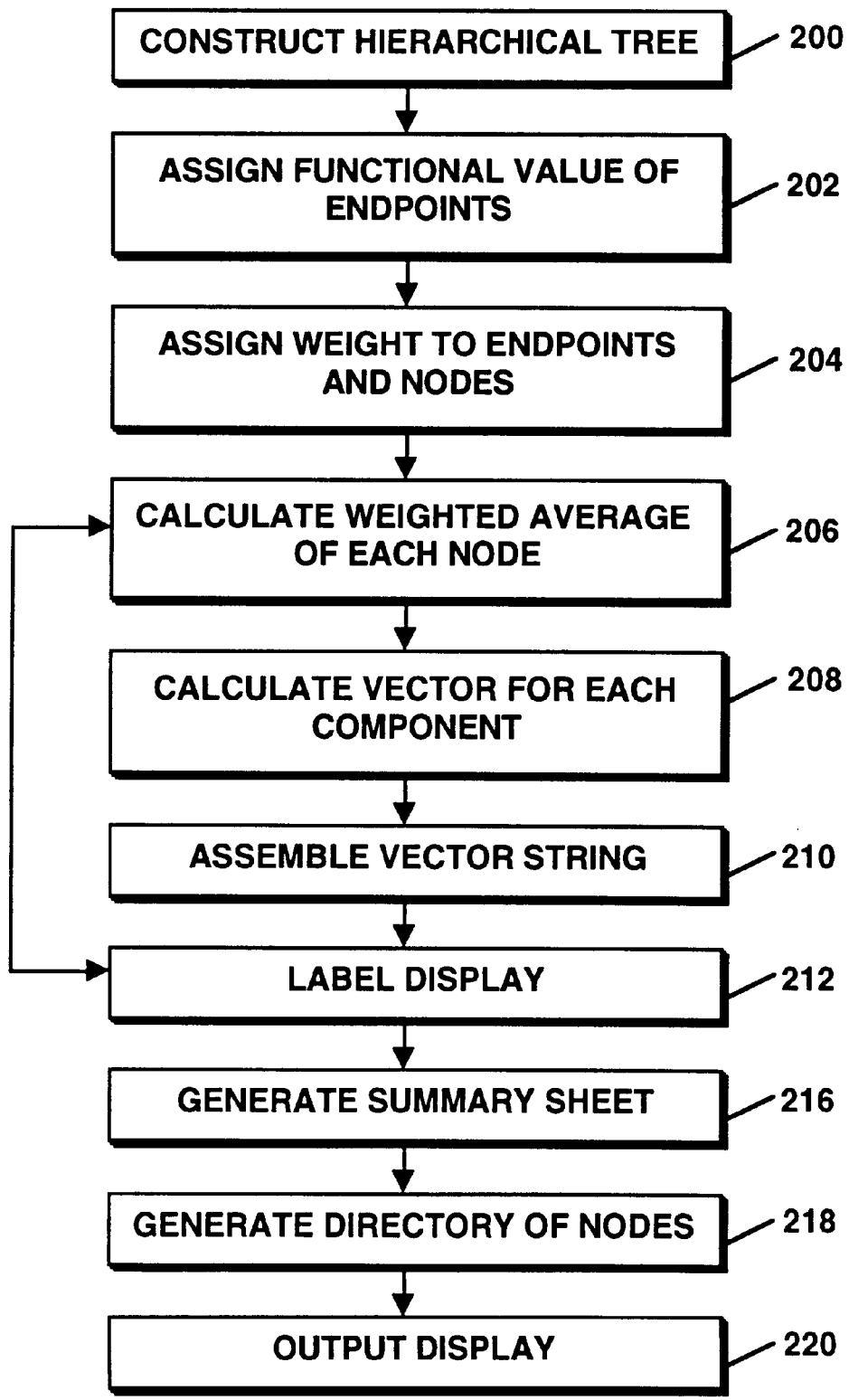
FIG. 21 is a flowchart of a process of displaying a vector for each of the components of an exemplary outline.

The method described in FIG. 5 may be more fully appreciated by referring to the flowchart of FIG. 21, wherein, at step 200 a hierarchical tree is constructed containing all the components of a subject under consideration. At step 202, a functional value is assigned to each of the endpoint components. In the preferred embodiment, the functional value is assigned a number of some arbitrary scale. The better score values are at the high end of the arbitrary scale and the poorer score values are in the low end of the arbitrary scale.

At step 204 a weight is assigned to every component, nodes as well as endpoints. A user through the CVAUI 22 obtains the assigned weight from an external standard and input. Weights usually have the same arbitrary scale as scores with the more important weights at the high end of the scale and the less important weights at the low end. Weights and score can be obtained in many ways. Usually they are obtained from a survey of votes, for both weights and scores, from experts and customers and these surveys can be simple to very expensive and far reaching. The CVAUI 22 can also accept negative scores and negative weights, both of which are processed correctly and their resultant vectors are also correct according to formal vector geometrical standards.

For every node in the hierarchy, steps 206 through 212 are executed. At step 206 the weighted average of each node is calculated for each of the candidates using the weights (W) of each component and the f functional scores of each candidate using the equation in FIG. 7.

At step 208, the vectors for each component for each candidate are calculated using the equations in Appendix B. At step 210 the vectors calculated in Step 208 produce a set of vector strings for each candidate and a vector string for the best in class benchmark and a vector string for the customer goal benchmark. Grid lines are used to connect common component vectors and each vector (being an object-oriented entity) may have its rank and scores displayed adjacent to it.

At step 212 each candidate's name, score, and benchmark percentage is displayed in order of winning rank.

The process of steps 206 through 212 is repeated until the entire hierarchy has been processed.

At step 216, a summary chart is generated to show the endpoint scores of each candidate, their relative percentage position to the winner in ascending order of priority based on percent of contribution. The summary chart is divided into four vertical parts showing the top 25% contributors. Each losing candidate is shown what could have happened had their losing endpoints matched the winner's score.

At step 218, a directory of nodes is calculated to enable the user to "drill up or down" the hierarchy from one vector to another.

At step 220, an output procedure is established to enable the user to easily select whatever set of node vector diagram desired.

Having described a preferred embodiment of the invention, it will now become apparent to those skilled in the art that other embodiments incorporating its concepts may be provided. It is felt therefore, that this invention should not be limited to the disclosed invention, but should be limited only by the spirit and scope of the appended claims.

What is claimed is:

1. A comparative visual assessment system comprising:
   an input device;
   an output device;
   a computer system, the computer system connected to the input device and the output device, the computer system having a user interface connected to a comparative visual assessment engine, the comparative visual assessment engine comprising:
   means for assigning a plurality of weights to a corresponding plurality of components representing a subject;
   means for assigning a plurality of scores to the corresponding plurality of components representing the subject;
   means for determining a functional score for each of the plurality of components;
   means for determining an angle to be used for an output to the output device of a vector for each of the plurality of components;
   means for assigning the functional score to a horizontal length of the vector for each of the plurality of components; and
   means for displaying the vector on the output device.

2. The comparative visual assessment system according to claim 1 wherein the means for determining a functional score comprises:
   means for assigning a value to the component's score times its weight divided by its weight.

3. The comparative visual assessment system according to claim 1 wherein the means for determining the angle comprises:
   means for determining a mathematical tangent of a difference between the component's weight and the component's a weight of a norm.

4. The comparative visual assessment system according to claim 1 wherein the user interface comprises an add-on to an Excel spreadsheet from Microsoft Corporation.

5. The comparative visual assessment system according to claim 1 wherein the computer system is executing a Windows 3.1 operating system from Microsoft Corporation.

6. The comparative visual assessment system according to claim 1 wherein the computer system is executing a Windows 95 operating system from Microsoft Corporation.

7. The comparative visual assessment system according to claim 1 wherein the computer system is executing a Windows NT operating system from Microsoft Corporation.

8. The comparative visual assessment system according to claim 1 wherein the input device comprises:
   a keyboard; and
   a mouse.

9. The comparative visual assessment system according to claim 1 wherein the output device is a printer.

10. A method of displaying a vector representing a subject having a plurality of components comprising the steps of:
    providing a computer system having an input device, an output device, a user interface, and a assessment engine;

constructing a hierarchical tree representing each of the plurality of components of the subject;

assigning a functional value to each of the components;

assigning a weight to each of the components;

determining a functional score for each of the components by dividing a product of the component's function value and weight by its weight to produce a quotient;

assigning the quotient as a first vector's length;

determining the first vector's angle by determining a tangent of a difference between its weight and a weight of a reference vector and dividing it by its weight; and displaying the first vector on the output device.

11. A method of displaying a plurality of vector strings on an output device comprising the steps of:

providing a computer system, the computer system having a user interface for input a plurality of data of a first type, an assessment engine for processing the plurality of data of the first type and for calculating data of a second type;

constructing an outline of a product, the outline subdivided into a hierarchy of nodes and endpoints, each endpoint referring to a node with no corresponding subcomponents;

assigning a plurality of weights of importance to each of the plurality of endpoints and nodes within the hierarchy;

assigning a plurality of a multiple set of functional values to each of the plurality of endpoints throughout the entire hierarchy for each candidate of product;

calculating a plurality of a multiple set of functional values to each of the plurality of nodes throughout the entire hierarchy for each candidate of product, wherein the step of calculating comprises the substeps of:

determining a sum of all multiplication products of each of the nodes subcomponents weight (W) times its corresponding functional value, all divided by the sum of the weights of all the subcomponents in the node whereby every element in all hierarchies have a unique value, assigned and calculated for each candidate;

determining a plurality of vectors for each of the plurality of nodes;

building a first vector string from the plurality of vectors; and displaying the first vector string on the output device.

* * * * *